United States Patent
Yoshida et al.

(10) Patent No.: US 10,296,447 B2
(45) Date of Patent: May 21, 2019

(54) AUTOMATED SOFTWARE PROGRAM REPAIR

(71) Applicant: FUJITSU LIMITED, Kawasaki-shi, Kanagawa (JP)

(72) Inventors: Hiroaki Yoshida, Cupertino, CA (US); Mukul R. Prasad, San Jose, CA (US); Benjamin Mehne, Berkeley, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/374,776

(22) Filed: Dec. 9, 2016

(65) Prior Publication Data
US 2018/0165182 A1    Jun. 14, 2018

(51) Int. Cl.
*G06F 9/44* (2018.01)
*G06F 11/36* (2006.01)
*G06F 8/65* (2018.01)

(52) U.S. Cl.
CPC .......... *G06F 11/3688* (2013.01); *G06F 8/65* (2013.01); *G06F 11/3624* (2013.01); *G06F 11/3644* (2013.01); *G06F 11/3692* (2013.01)

(58) Field of Classification Search
CPC .................................. G06F 11/36–11/3696
USPC .................................................. 717/124–135
See application file for complete search history.

(56) References Cited

U.S. PATENT DOCUMENTS

| 5,581,696 A * | 12/1996 | Kolawa | G06F 11/3624 |
| | | | 714/38.1 |
| 9,846,637 B2 * | 12/2017 | Yoshida | G06F 11/3692 |
| 2002/0073398 A1 * | 6/2002 | Tinker | G06F 8/65 |
| | | | 717/110 |
| 2007/0061626 A1 * | 3/2007 | Nelson | G06F 11/3688 |
| | | | 714/38.14 |
| 2009/0113399 A1 * | 4/2009 | Tzoref | G06F 11/3632 |
| | | | 717/130 |
| 2009/0249309 A1 * | 10/2009 | Li | G06F 11/3636 |
| | | | 717/132 |
| 2009/0292941 A1 * | 11/2009 | Ganai | G06F 11/3636 |
| | | | 714/2 |

(Continued)

OTHER PUBLICATIONS

Cleve et al. "Locating Causes of Program Failures", 2005, ICSE'05.*

(Continued)

*Primary Examiner* — Jue Louie
(74) *Attorney, Agent, or Firm* — Maschoff Brennan

(57) ABSTRACT

A method may include identifying a fault location in a software program. The method may further include generating an instrumentation function with respect to the fault location. In addition, the method may include replacing a statement at the fault location with the instrumentation function and performing a first test execution of the software program with the implemented instrumentation function. The method may also include selecting the fault location for implementation of a repair candidate based on output of the instrumentation function in response to the first test execution and implementing the repair candidate at the fault location as a patch based on the selection. Moreover, the method may include performing a second test execution of the software program with respect to the patch, evaluating the patch based on results of the second test execution, and accepting or rejecting the patch based on the evaluation.

16 Claims, 6 Drawing Sheets

(56) References Cited

U.S. PATENT DOCUMENTS

| | | | |
|---|---|---|---|
| 2012/0185731 A1* | 7/2012 | Barman | G06F 11/3604 |
| | | | 714/38.1 |
| 2016/0259713 A1* | 9/2016 | Belur | G06F 11/3676 |
| 2017/0262361 A1* | 9/2017 | Francis | G06F 11/3688 |
| 2018/0300229 A1* | 10/2018 | Kornfeld | G06F 11/0709 |

OTHER PUBLICATIONS

Wei et al. "Automated Fixing of Programs with Contracts", 2010, ISSTA'10.*

Debroy et al. "Combining mutation and fault localization for automated program debugging", 2014, Journal of Systems and Software.*

Renieris et al., "Fault Localization with Nearst Neighbor Queries", 2003, Proceedings of the 18th IEEE International Conference on Automated Software Engineering.*

Liu et al., "Failure Proximity: A Fault Localization-Based Approach", 2006, SIGSOFT'06.*

Weimer et al., ICSE'09, Le Goues et al., ICSE'12) Genetic programming based search method where repair templates are identified from existing program structure 2 bugs out of 105 bugs in GenProg benchmark are repaired (Long et al., ISSTA'15) (2009), "A systematic Study of Automated Program Repair: Fixing 55 out of 105 Bugs for $8 Each".

(Nguyen et al., ICSE'13) Program synthesis based method where a repair is synthesized based on symbolic execution result (2013), "SemFix: Program Repair via Semantic Analysis".

(Kim et al., ICSE'13) Rule-based method where repair templates are manually predefined based on human patch analysis (2013), "Automatic Patch Generation Learned from Human-Written Patches".

(DeMarco et al., CSTVA'14) SemFix successor based on angelic debugging technique instead of symbolic execution (2014), "Automatic Repair of Buggy If Conditions and Missing Preconditions with SMT".

(Kaleeswaran, et al., ICSE'14) SemFix variant where MintHint statistically finds repair hints, not an exact repair (2014), "MintHint: Automated Synthesis of Repair Hints".

(Tan et al., ICSE'15) Find a repair for regression bugs from software change history (2015), "relifx: Automated Repair of Software Regressions".

(Mechtaev et al., ICSE'15) SemFix successor where the patch size is minimized using MaxSAT solver (2015), "DirectFix: Looking for Simple Program Repairs".

(Long et al., ISSTA'15) GenProg successor which improves efficiency by limiting repair templates to only functional deletions 2 bugs out of 105 bugs in GenProg benchmark are repaired, "An Analysis of Patch Plausibility and Correctness for Generate-and-Validate Patch Generation Systems".

(Long et al., FSE'15) SemFix variant where SPR uses a set of efficient techniques instead of symbolic execution and SMT solving 11 bugs out of 105 bugs in GenProg benchmark are repaired, "Staged Program Repair with Condition Synthesis".

(Long et al., POPL'16) Learns a model from a set of successful human patches and uses the model to rank candidate patches in order of likely correctness, "Automatic Patch Generation by Learning Correct Code".

Pending U.S. Appl. No. 14/835,561, filed Aug. 25, 2015.
Pending U.S. Appl. No. 14/957,529, filed Dec. 2, 2015.
Pending U.S. Appl. No. 15/051,503, filed Feb. 23, 2016.
Pending U.S. Appl. No. 15/276,628, filed Sep. 26, 2016.

* cited by examiner

AUTOMATED SOFTWARE PROGRAM REPAIR

FIELD

The embodiments discussed in the present disclosure are related to automated software program repair.

BACKGROUND

Software programs often have faults in them (commonly referred to as "bugs") in which they may not operate as intended. Often automated repair systems are used in attempt to identify and correct faults in software programs.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include identifying a fault location in a software program. The method may further include generating an instrumentation function with respect to the fault location. In addition, the method may include replacing a statement at the fault location with the instrumentation function and performing a first test execution of the software program with the implemented instrumentation function. The method may also include selecting the fault location for implementation of a repair candidate based on output of the instrumentation function in response to the first test execution and implementing the repair candidate at the fault location as a patch based on the selection. Moreover, the method may include performing a second test execution of the software program with respect to the patch, evaluating the patch based on results of the second test execution, and accepting or rejecting the patch based on the evaluation.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
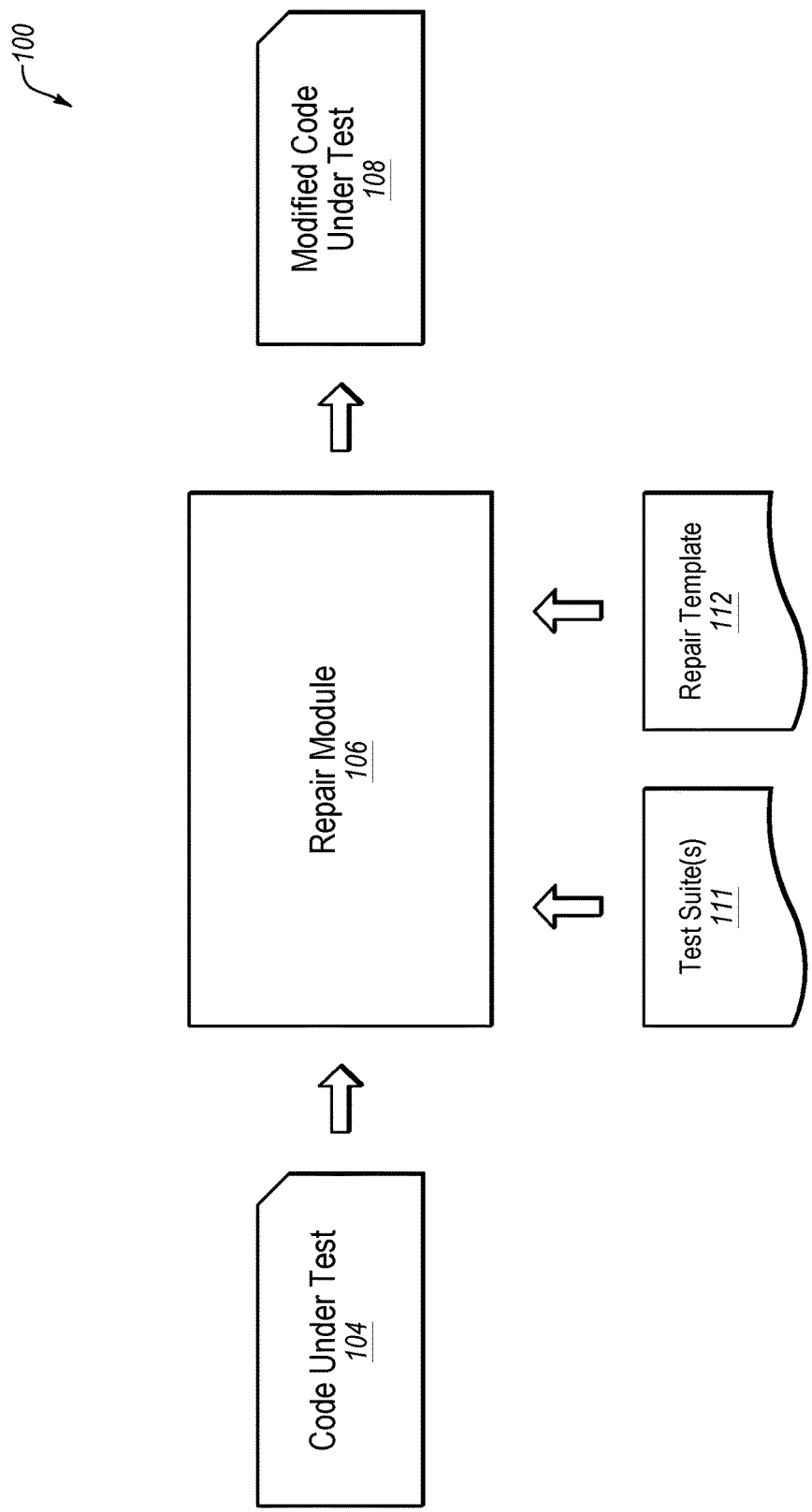
FIG. 1 is a diagram representing an example environment related to repairing a software program.

Some embodiments described in the present disclosure relate to methods and systems of repairing software programs. Software programs often include faults (also commonly referred to as "bugs") that may cause the software programs to behave in an unintended manner. Additionally, automated repair systems and techniques are often used to detect and correct faults to repair software programs. However, automated repair systems and techniques often implement repairs in incorrect locations. In addition, automated repair systems often perform unnecessary tests of the attempted repair of the software program. As such, automated repair systems and techniques may take more time to execute and may make modifications to software programs in attempts to fix faults that do not appropriately repair the fault in the software program but that may also take more time to test and may not show up as being incorrect when being tested.

According to one or more embodiments described in the present disclosure, one or more fault locations may be identified in a software program. The software program may be instrumented in the fault locations to obtain information about the software program. For example, the instrumentation may be used to identify variables in statements at fault locations and the values of variables in statements at fault locations in some embodiments.

In some embodiments, the fault locations may be prioritized with respect to at which fault location a repair candidate may be implemented based on the information obtained by the instrumentation of the software program. For example, the fault locations may be prioritized based on the variables and the variable values prior to the selection of a fault location for implementation of a repair candidate.

In these or other embodiments, tests of a test suite may be prioritized with respect to which tests may be performed with respect to the selected fault location. In some embodiments, the prioritization of the fault locations or the prioritization of the tests may reduce the number of tests used or the number of fault locations modified during the performance of repair operations of the software program. In some embodiments, an efficacy of the repair candidates may be tested using partial interpretation. Partial interpretation may involve compiling the software program fewer times (e.g., once) and using interpretation at fault locations with the repair candidate code instructions. This may also improve the efficiency of the repair operations by increasing the speed of testing. Compiling the software program may be a slow operation, so compiling the software program fewer times may reduce the time to complete repair operations. Interpreting a software program may be a slow operation, so interpreting the software program at fault locations while executing the compiled software program in other locations may increase the speed of testing the efficacy of repair candidates.

In the present disclosure reference to prioritizing fault locations may include ranking fault locations such that a fault location with a higher priority may be selected during the performance of repair operations prior to a fault location with a lower priority. Additionally or alternatively, prioritizing fault locations may include discarding or pruning fault locations. Fault locations that are discarded or pruned may not be chosen during the performance of repair operations in some instances. In the present disclosure, reference to prioritizing tests in a test suite may include ranking tests such that a test with a higher priority is executed during the performance of repair operations prior to a test with a lower priority. Additionally or alternatively, prioritizing tests in a test suite may include discarding or pruning tests. Tests that are discarded or pruned may not be executed during the performance of repair operations in some instances.

The prioritization of fault locations may improve the efficiency of automated software program repair by giving a higher priority to implementing repairs at fault locations that may be more likely to produce a passing repair of the software program. For example, in some embodiments, the prioritization of fault locations may improve the efficiency of automated software program repair by reducing the number of fault locations that are tested. Further, in some embodiments, the prioritization of tests of a test suite may improve the efficiency of automated software program repair by reducing the number of tests executed. Additionally or alternatively, the execution of the software program with partial interpretation may enable the software program to be compiled fewer times and run with localized areas of interpretation at the fault locations. In some embodiments, partial interpretation may be performed with respect to units of the software program that include fault locations instead of with respect to the entire software program, which may reduce the amount of processing performed.

Embodiments of the present disclosure are explained with reference to the accompanying drawings.

FIG. 1 is a diagram representing an example environment 100 related to repairing a software program, arranged in accordance with at least one embodiment described in the present disclosure. The environment 100 may include a repair module 106 configured to analyze code under test 104 for faults. The repair module 106 may also be configured to output modified code under test 108, which may include one or more modifications made to the code under test 104 by repair operations performed by the repair module 106.

The code under test 104 may include electronic data, such as, for example, the software program, code of the software program, libraries, applications, scripts, or other logic or instructions for execution by a processing device. In some embodiments, the code under test 104 may include a complete instance of the software program. Additionally or alternatively, the code under test 104 may include a portion of the software program. The code under test 104 may be written in any suitable type of computer language that may be used for the software program.

The repair module 106 may include code and routines configured to enable a computing device to perform one or more modifications of the code under test 104 to generate the modified code under test 108. Additionally or alternatively, the repair module 106 may be implemented using hardware including a processor, a microprocessor (e.g., to perform or control performance of one or more operations), a field-programmable gate array (FPGA), or an application-specific integrated circuit (ASIC). In some other instances, the repair module 106 may be implemented using a combination of hardware and software. In the present disclosure, operations described as being performed by the repair module 106 may include operations that the repair module 106 may direct a corresponding system to perform.

The repair module 106 may be configured to perform a series of repair operations with respect to the code under test 104 that may be used to repair (also referred to as correct) one or more faults in the code under test 104. In some embodiments, the repair module 106 may be configured to perform one or more of the repair operations based on a repair template 112 and one or more test suites 111.

The repair template 112 may include any suitable type of instructions or routines that, when executed, may be configured to implement one or more modifications with respect to the code under test 104 in response to the presence of faults in the code under test 104. The modifications may include changes in the code under test 104 that may repair or attempt to repair the faults. In the present disclosure, the modifications that may be performed may be referred to as "repair candidates" or "repairs."

The test suites 111 may include one or more routines that may act as test cases for the code under test 104. The test suites 111 may be configured to determine whether the code under test 104 behaves in a specified manner. The test suites 111 may be configured according to any suitable technique.

The repair module 106 may be configured to apply one or more of the test suites 111 with respect to the code under test 104 to detect or determine one or more faults and corresponding fault locations in the code under test 104. In some embodiments, the repair module 106 may be configured to execute one or more tests included in the test suites 111, which may be referred to as performing a test execution. A test execution that passes may be referred to as a "passing test execution" and a test execution that fails may be referred to as a "failing test execution." In some embodiments, a fault location and corresponding fault of the code under test 104 may be identified based on a failing test execution executing code appearing at the fault location.

In some embodiments, the repair module 106 may be configured to identify one or more fault locations in the code under test 104 based on the execution of one or more tests of the test suites 111. In these or other embodiments, the repair module 106 may be configured to instrument the code under test 104 with one or more instrumentation functions. In some embodiments, the instrumentation functions may be configured to identify information about the code under test 104 at the fault locations.

For example, the instrumentation functions may be configured to identify one or more variables of the software program that are included in a statement at the fault location in some embodiments. Additionally or alternatively, the instrumentation functions may be configured to identify one or more values of one or more variables of the software program that are included in a statement at the fault location. For example, the instrumentation functions may identify that a variable "x" and a variable "y" are included in a statement at the fault location. The instrumentation functions may also identify that the variable "x" has values of 147 and 148 and the variable "y" has a value of 251 during execution of the code. In some embodiments, the values of the variables, such as the values of the variables "x" and "y" in this example, may change depending on the tests that are run on the code. For example, the value of "x" may be 120 during a first test of the code and the value of "x" may be 200 during a second test of the code. In some embodiments, the instrumented functions may be configured to identify test coverage information. Test coverage information may be used to identify which tests of the test suite 111 are executed at each fault location. This information may be used to prioritize the tests of the test suite 111 as discussed further below.

The repair module 106 may also be configured to compile the code under test 104 with the instrumented functions. The repair module 106 may also perform a test execution of the code under test 104 with the instrumented functions. The repair module 106 may be configured to prioritize the fault locations in the code under test 104 based on the information that may be obtained from the instrumented functions. For example, in some embodiments, the repair module 106 may prioritize a particular fault location by comparing the value of a variable in a failing execution of the code in the particular fault location with the value or values of the variable in one or more passing executions of the code in the fault location. For example, in some embodiments, the repair module 106 may be configured to determine a difference between the value of the variable in the failing execution and the value of the variable in a passing execution. In some embodiments, in response to the difference not satisfying a threshold, the particular fault location may be assigned a lower priority as opposed to in response to the difference satisfying the threshold. In some embodiments, in instances in which there are multiple values for the variable or there are multiple variables with at least one value, the lower priority may be assigned in response to none of the values having a difference that satisfies the difference. In these or other embodiments, the prioritization may be based on the amount in the difference. For example, a higher priority may be assigned for a larger difference than for a smaller difference. In some embodiments, the prioritization may include pruning the particular fault location and not selecting the particular fault location for generation of repair candidates.

The repair module 106 may be configured to select a particular fault location based on the priority of the particular fault location. The prioritization may be used to determine the order of selection of fault locations during the performance of the repair operations. A fault location with a higher priority may be selected prior to the selection of a fault location with a lower priority. For example, the repair module 106 may compare the priorities of each of the different fault locations. A particular fault location may have a higher priority than each of the other fault locations. Based on the comparison of the priorities, the repair module 106 may select a particular fault location that has a higher priority instead of selecting a fault location that has a lower priority. Additionally or alternatively, the repair module 106 may be configured to implement a repair candidate of the repair template 112 with respect to the selected particular fault location as opposed to other fault locations based on the particular fault location having a higher priority than the other fault locations. In some embodiments, the repair module 106 may be configured to implement repair candidates for multiple fault locations.

In some embodiments, the repair module 106 may be configured to prioritize the tests of the test suite 111 based on the information that may be obtained from the instrumented functions. For example, the instrumented functions may be used to determine which tests of the test suite 111 execute each of the fault locations. The prioritization may be used to determine which tests to run with respect to a particular fault location at which a repair candidate may be implemented. For example, in some embodiments, the repair module 106 may prioritize a particular test by determining that the particular test is executed at the fault location and may then assign the particular test a higher priority. In some embodiments, the repair module 106 may prioritize a different test of the test suite 111 by determining that the different test is not executed at the fault location and may then assign the different test a lower priority. In some embodiments, the repair module 106 may determine that a particular test in the test suite 111 may not be executed at a particular fault location and assign the test a lower priority. For example, the repair module 106 may determine that a particular test in the test suite 111 is not executed at a particular fault location and may prune the particular test for a test execution that may be performed with respect to the particular fault location with a repair candidate implemented therein. In some embodiments, a pruned test may not be executed during a test execution of the repair candidate.

In some embodiments, the repair module 106 may be configured to run a test execution of the code under test 104 with one or more implemented patches and with partial interpretation. In the present disclosure, reference to a "patch" may refer to the implementation of a particular repair candidate into the code under test 104 at a particular fault location. In these or other embodiments, the repair module 106 may be configured to directly interpret the patch. The repair module 106 may be configured to execute the compiled code under test 104 and interpret the patch without compiling the patch. In some embodiments, the repair module 106 may be configured to perform one or more operations according to a method 300 of FIG. 3 (described in detail below), a method 400 of FIG. 4 (described in detail below), and a method 500 of FIG. 5 (described below) to determine the prioritization of the fault locations and the prioritization of the tests and to interpret the repair candidates.

The repair module 106 may also be configured to perform repair operations on the code under test 104. The repair operations may be based on the prioritization of the fault locations in some embodiments. For example, in some embodiments, the repair module 106 may perform repair operations at a particular fault location in response to the particular fault location having the higher priority than other fault locations. The repair operations may include implementing a repair candidate at the particular fault location as a particular patch and performing tests on the particular patch. The repair operations may be based on the prioritization of the tests with respect to the particular fault location as described above in some embodiments. The repair module 106 may be configured to keep the particular patch in response to the tests passing. Keeping the implementation of the particular patch may result in a correction of the fault in the software program. Additionally or alternatively, the repair module 106 may be configured to output the modified code under test 108, which may include one or more patches that may be implemented based on the prioritization of the fault locations. In these or other embodiments, the repair module 106 may be configured to output the modified code under test 108 in response to keeping the implementation of the repair candidate in the code under test 104.

Modifications, additions, or omissions may be made to FIG. 1 without departing from the scope of the present disclosure. For example, the environment 100 may include more or fewer elements than those illustrated and described in the present disclosure. In addition, in some embodiments, one or more routines, one or more instructions, or at least a portion of code of the repair module 106, the test suites 111, and the repair template 112 may be combined such that they may be considered the same element or may have common sections that may be considered part of two or more of the repair module 106, the test suites 111, and the repair template 112.

In some embodiments operations may be performed in a different order from what is described above. For example, the prioritizing or pruning of the tests of the test suite 111 may be performed either before implementing a repair candidate or after implementing a repair candidate.

Figure 2:
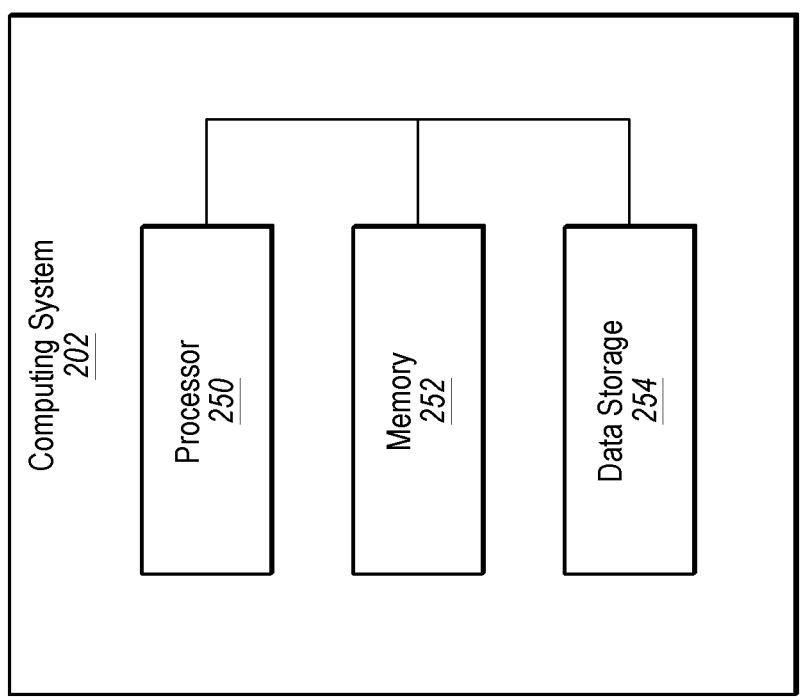
FIG. 2 illustrates an example computing system that may be configured to repair a software program.

FIG. 2 illustrates a block diagram of an example computing system 202, according to at least one embodiment of the present disclosure. The computing system 202 may be configured to implement or direct one or more operations associated with a repair module (e.g., the repair module 106 of FIG. 1). The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the repair module may be included in the data storage 254 as program instructions. The processor 250 may fetch the program instructions of the repair module from the data storage 254 and may load the program instructions of the repair module in the memory 252. After the program instructions of the repair module are loaded into memory 252, the processor 250 may execute the program instructions such that the computing system may implement the operations associated with the repair module as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3A:
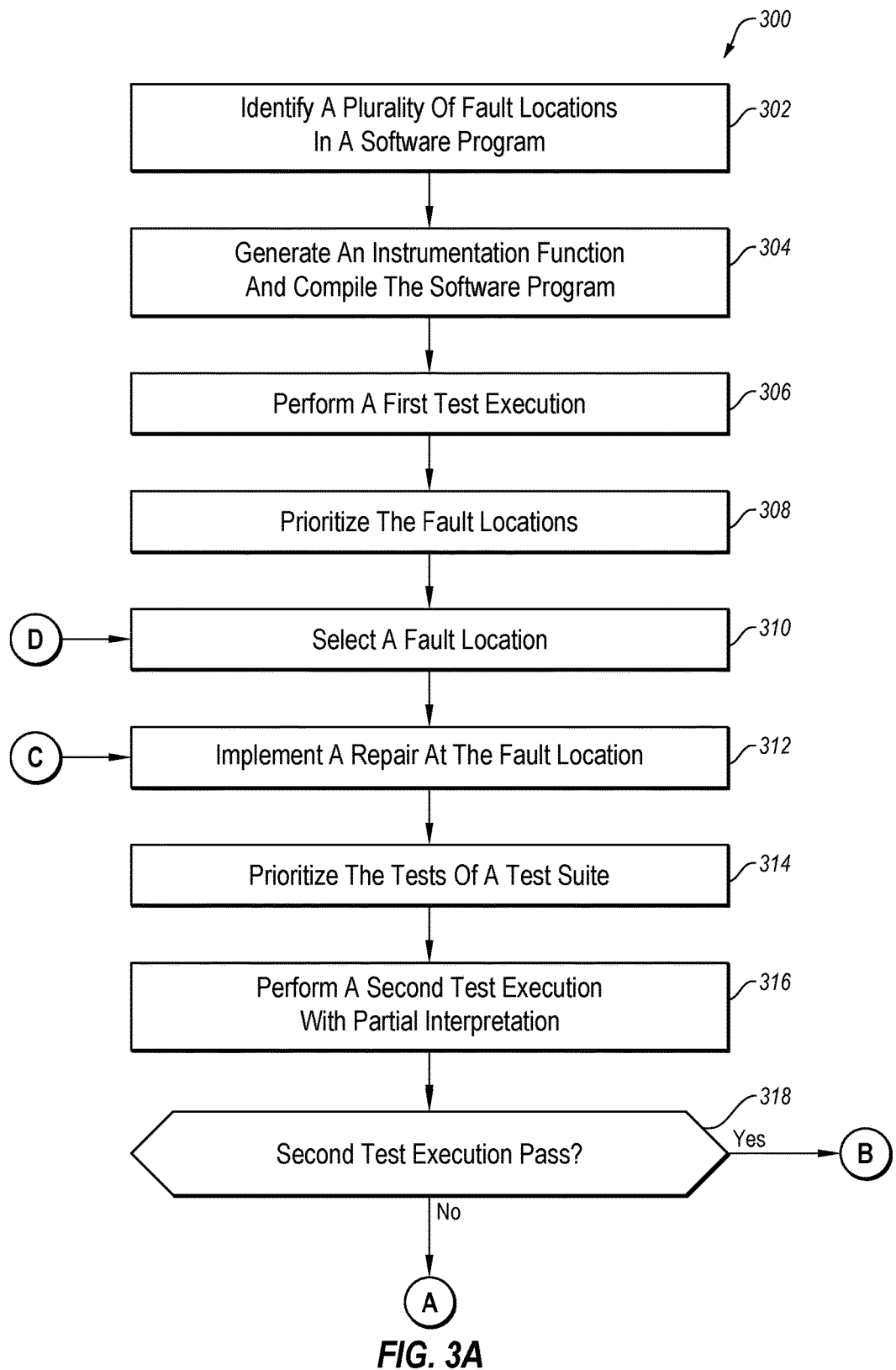
FIGS. 3A and 3B depict a flowchart of an example method of repairing a software program.
Figure 3B:
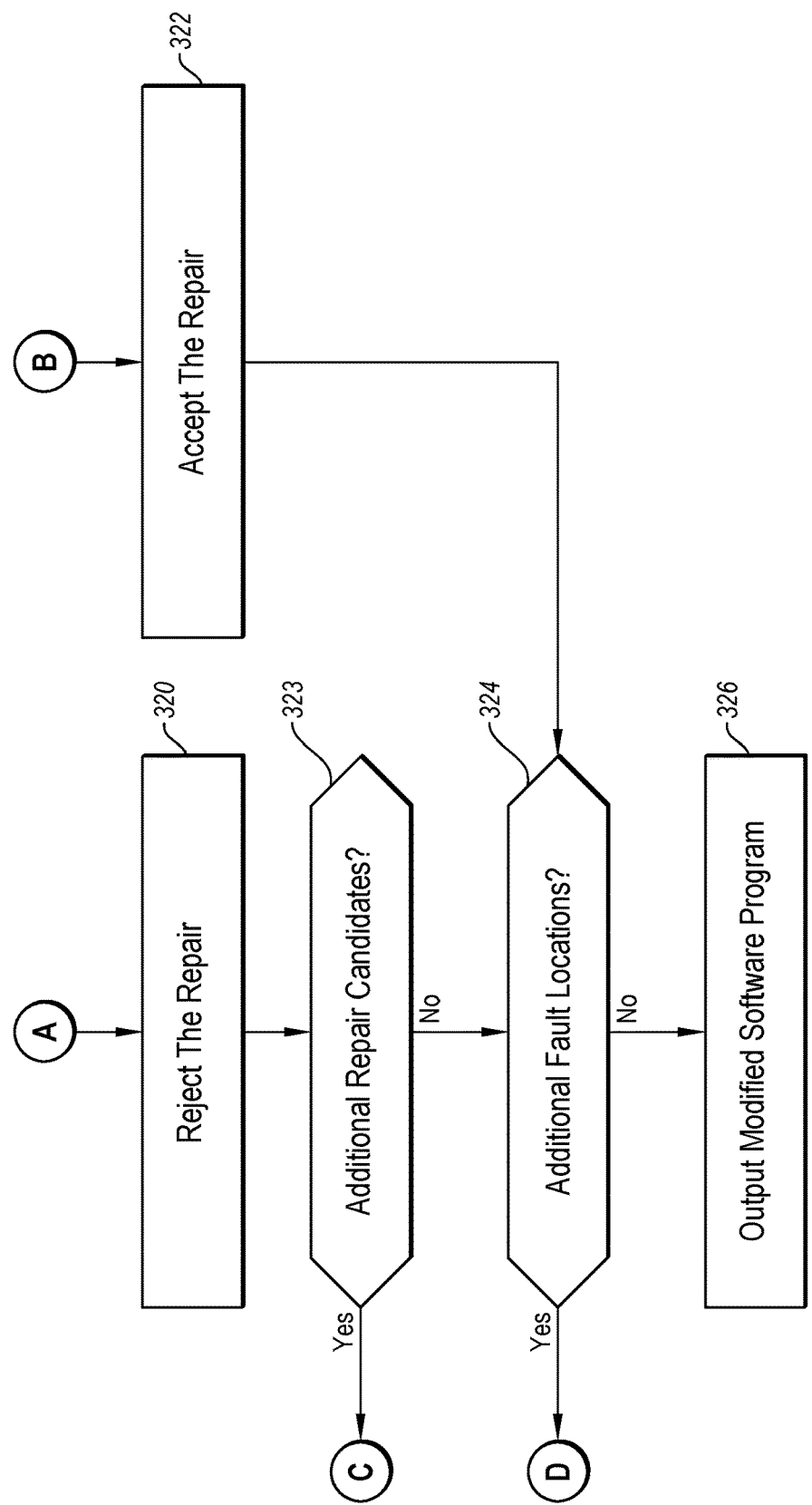

FIGS. 3A and 3B depict a flowchart of an example method 300 of repairing a software program, according to at least one embodiment described in the present disclosure. The method 300 may be performed by any suitable system, apparatus, or device with respect to code under test (e.g., the code under test 104 of FIG. 1) of the software program. For example, the repair module 106 of FIG. 1 or the computing system 202 of FIG. 2 (e.g., as directed by a repair module) may perform or direct performance of one or more of the operations associated with the method 300 with respect to the software program. Although illustrated with discrete blocks, the steps and operations associated with one or more of the blocks of the method 300 may be divided into additional blocks, combined into fewer blocks, or eliminated, depending on the particular implementation.

The method 300 may include a block 302, at which a multiple faults and corresponding fault locations may be identified in the software program. The fault identification may be performed with respect to the software program using any suitable technique. For example, in some embodiments, the fault identification may be performed based on performing a test execution of the one or more test suites with respect to the software program.

At block 304, multiple instrumentation functions may be generated and the software program may be compiled. In some embodiments, an instrumentation function may be generated for each fault location and may be implemented at each fault location. The instrumentation functions may provide information about the execution of the program and about the fault locations.

For example, in some embodiments, the instrumentation functions may be configured to identify information about the software program at the fault locations. For instance, in some embodiments, a particular instrumentation function may be configured to identify one or more variables of the software program that are included in a statement at a corresponding fault location. Additionally or alternatively, the particular instrumentation function may be configured to identify one or more values of one or more variables of the software program that are included in a statement at the fault location. For example, the particular instrumentation function may identify that a variable "x" and a variable "y" are included in a statement at the fault location. The instrumentation functions may also identify that the variable "x" has values of 147 and 148 and the variable "y" has a value of 251 during execution of the software program. In some embodiments, the values of the variables, such as the values of the variables "x" and "y" in this example, may change depending on the tests that are run on the software program.

In some embodiments, the instrumented functions may be configured to identify test coverage information. Test coverage information may be used to identify which tests of the test suite 111 are executed at each fault location. Test coverage information may be used to prioritize the tests of the test suite 111.

In addition, the instrumentation functions may be configured to allow the interpretation of statements when a repair candidate for the fault location has been implemented as a patch. For example, when a patch has been implemented, the instrumentation function may cause the patch to be interpreted during testing of the repair candidate. When a patch for the fault location has not been implemented, the instrumentation function may not cause a repair candidate to be interpreted and may instead cause the original statement to be executed as compiled code.

The software program with the instrumented functions at the fault locations may be compiled to generate a compiled software program in a machine language. Additional details about the instrumentation and compilation of the software program are described below with regards to FIG. 4.

At block 306, a first test execution may be performed by running one or more test suites with respect to the instrumented and compiled software program. The instrumented and compiled code under test may be executed by a processor such as the processor 250 of FIG. 2. In some embodiments, the processor may execute each line of the instrumented and compiled software program. The first test execution may generate information about the software program from the instrumentation functions, such as a list of the variables included in each statement at a fault location, the value or values of each of the variables in each statement at a fault location, test coverage information, and other information about the execution of the software program and about the fault locations. In some instances, because there may be no repair candidates implemented in the instrumented and compiled software program, executing the instrumented and compiled software program during the first test execution may not result in the interpretation of any patches of code.

At block 308, the fault locations identified at block 302 may be prioritized based on the information that may be obtained from the instrumented functions from the first test execution performed at block 306. In some embodiments, a particular fault location may be prioritized by comparing information from a failed execution of the compiled program at the particular fault location with information from one or more passing executions of the compiled program at the particular fault location. For example, in some embodiments, the value of a variable in a failing execution of the code in the particular fault location may be compared with the value or values of the variable in one or more passing executions of the code in the fault location.

For example, in some embodiments, the repair module may be configured to determine a difference between the value of the variable in the failing execution and the value of the variable in a passing execution. In some embodiments, in response to the difference not satisfying a threshold, the particular fault location may be assigned a lower priority as opposed to in response to the difference satisfying the threshold. For example, in some embodiments, the prioritization of fault locations of block 308 may include discarding or pruning fault locations. By discarding or pruning fault locations that are less likely to be the source of faults, the repair operations may be completed more quickly without sacrificing the efficacy of the repair candidates or the outputted modified code under test. In some embodiments, a discarded or pruned fault location may be restored when repair candidates for all other fault locations have been rejected in block 320. Additional details about the prioritization of a fault location are described below with regards to FIG. 5.

At block 310, a particular fault location may be selected based on the priority of the particular fault location. The prioritization may be used to determine the order of selection of a particular fault location for implementation of a repair candidate during the performance of the repair operations. For example, the repair module may compare the priorities of each of the different fault locations. A particular fault location may have a higher priority than each of the other fault locations. Based on the comparison of the priorities, the repair module may select the particular fault location that has a higher priority instead of selecting a fault location that has a lower priority. The repair module may implement a repair candidate at the selected fault location.

At block 312, a repair candidate may be implemented at the selected fault location as a patch. In some embodiments, the repair candidate may be implemented based on a repair template such as described above. The repair candidate may be implemented in an attempt to correct a fault in the software program at the selected particular fault location.

At block 314, the tests of a test suite may be prioritized based on the information that may be obtained from the instrumented functions during the first test execution of block 306. For example, the instrumented functions may determine which tests of the test suite are executed at each of the fault locations. The prioritization may be used to determine whether a test should be performed at a particular fault location during a second test execution at block 316. For example, in some embodiments, a particular test may be prioritized to be included in the second test execution with respect to the particular fault location by determining that the particular test is executed at the fault location. In some embodiments, a different test of the test suite may prioritized to be excluded from the second test execution (also referred to as "pruned") with respect to the particular fault location by determining that the different test is not executed at the fault location. By pruning tests of the test suite that are not executed at the location of the repair candidate, the repair operations may be completed more quickly.

At block 316, the second test execution with partial interpretation may be performed by running one or more prioritized tests of the test suite with respect to the patch implemented at block 312 in the instrumented and compiled software program. The instrumented and compiled software program may be executed by a processor such as the processor 250 of FIG. 2. The second test execution may generate information about the software program and the implemented patch, such as whether the software program and the implemented patch passed the prioritized tests of the test suite. In some embodiments, the processor may execute each line of the instrumented and compiled software program. The instrumented and compiled software program may include code instructions that cause the program to be interpreted with respect to the patch. During the performance of the second test execution, in response to an implemented patch for the particular fault location, an instrumentation function may cause the patch to be interpreted during testing of the repair candidate.

In response to a patch for the fault location not being implemented, the instrumentation function may not cause a repair candidate to be interpreted and may instead cause the original statement to be executed as compiled code. In some instances, because there may be no implemented patches at a particular fault location for the instrumented and compiled software program, executing the instrumented and compiled software program during the second test execution may not result in the interpretation of any patches of code at the particular fault location. The second test execution may generate information about the patch, such as a whether the second test execution passed each executed test of the test suite in response to the patch being implemented.

At block 318, it may be determined whether the second test execution was passed. To determine whether the second test execution was passed, each of the tests of the test suite that were executed during the second test execution may be examined. In response to all of the tests passing ("Yes" at block 318), the method may proceed to block 322. In response to at least one of the tests not passing ("No" at block 318), the method may proceed to block 320.

At block 320, the repair candidate may be rejected. In particular, because at least one of the tests executed during the second test execution is not passed ("No" at block 318), the repair candidate may not have resolved the faults at the fault location. In response to the repair candidate being rejected, the repair candidate may be removed from the software program. The method may proceed to block 323.

At block 322, the repair candidate may be accepted. Because all of the tests of the test suite may have been passed ("Yes" at block 318), the repair candidate may have resolved the faults at the fault location. The implementation of the repair candidate may be kept in such instances such that it may be implemented into modified software program described with respect to block 326. In some embodiments, the method 300 may proceed to block 324 following block 322.

At block 323, it may be determined whether there are additional repair candidates for the software program at the selected fault location. In response to determining that there are additional repair candidates ("Yes" at block 323), the method may return to block 312 and another repair candidate for the selected fault location may be implemented. In response to determining that there are no additional repair candidates ("No" at block 323), the method may proceed to block 324.

At block 324, it may be determined whether there are additional fault locations in the software program. In response to determining that there are additional fault locations ("Yes" at block 324), the method may return to block 310 and another fault location may be selected. In response to determining that there are no additional fault locations ("No" at block 324), the method may proceed to block 326.

At block 326, the modified software program may be output as the modified code under test 108 of FIG. 1. The modified software program may include modifications that may include one or more repair candidates that may be implemented based on the repair prioritization described above such that the modified software program may include a repaired version of the software program that may be received at block 302. In some embodiments, in response to all repair candidates being rejected, the modified software program may not include any modifications and may not include a repaired version of the software program.

The method 300 may improve the efficiency and efficacy of software program testing and repair. For example, the determining of the prioritization of fault locations based on information from the first test execution may help better select a particular fault location to test for repair candidates. The prioritization may help reduce the time it takes to perform repair operations as some fault locations may be eliminated prior to performing the test suite. In addition, the determining of the prioritization of the tests of the test suite may help reduce the time it takes to test repair candidates by removing or lowering the priority of some tests that may provide less or no information regarding a patch. The prioritization of the tests may help reduce the time it takes to perform repair operations as some tests of the test suite may be eliminated prior to testing a patch. Additionally, performing repair operations with partial interpretation may reduce the number of compiles of the software program that may be performed, which may increase the speed of repair operations and may also help with processing efficiency.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the operations described with respect to block 312 and block 314 may be implemented in a different order. In some embodiments, the operations described with respect to block 312 and block 314 may be implemented simultaneously. In some embodiments, the prioritizing of the tests of the test suite may occur prior to the implementation of a repair candidate at the fault location. In some embodiments, in response to the determination that there are additional repair candidates ("Yes" at block 323), the method may proceed to implement a different repair candidate at the fault location and may not prioritize the tests of the test suite again.

In addition, in some embodiments, the method 300 may be performed iteratively in which a single fault location and a single repair candidate that corresponds to the fault location may be analyzed at a time. Additionally or alternatively, one or more operations associated with one or more blocks may be performed with respect to multiple fault locations or multiple repair candidates at a time.

Figure 4:
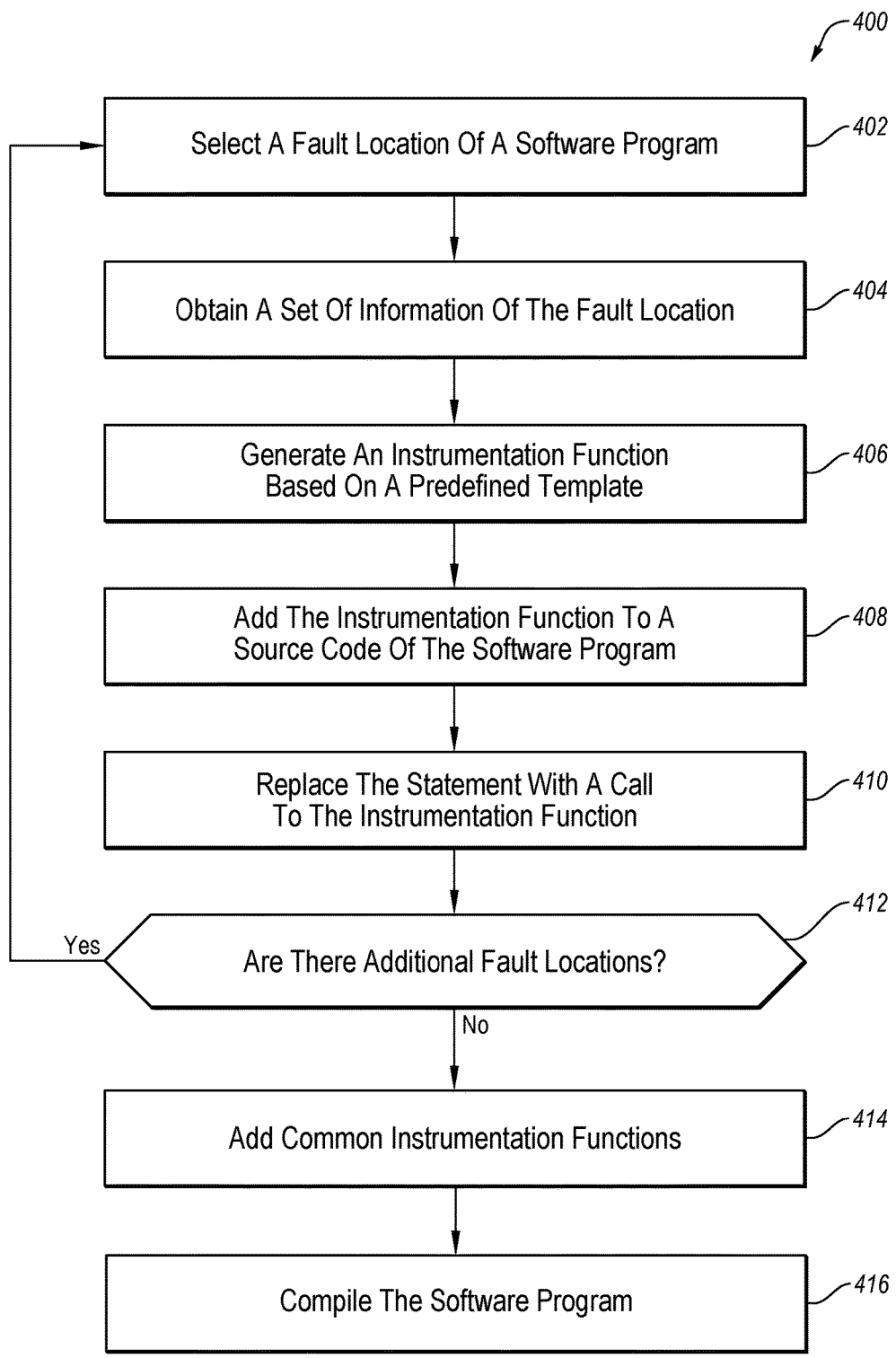
FIG. 4 depicts a flowchart of an example method of generating and implementing an instrumentation function.

FIG. 4 depicts a flowchart of an example method 400 of generating and implementing one or more instrumentation functions with respect to a software program and compiling the instrumented software program, according to at least one embodiment described in the present disclosure. The method 400 may be performed by any suitable system, apparatus, or device with respect to code under test. For example, the repair module 106 of FIG. 1 or the computing system 202 of FIG. 2 (e.g., as directed by a repair module) may perform or direct performance of one or more of the operations associated with the method 400 with respect to code under test of the software program. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a fault location of a software program may be selected. The fault location of the software program may be selected using any suitable technique. For example, in some embodiments, the fault location may be selected based on its location in the software program. In some embodiments, a fault location of the software program may not be selected in block 402 in instances in which it has been selected in a prior iteration of the method 400.

At block 404, a set of information of the fault location may be obtained. In some embodiments, the set of information may be obtained by analyzing the source code of the software program. In some embodiments, the information obtained may include a list of input variables and input variable types in a statement at the fault location. Variable types may include any standard variable type in a software program, including booleans, integers, floating point numbers, strings, characters, among other software programming variable types and other variable types.

In these or other embodiments, the information obtained may include a location number of the statement at the fault location. The location number may be an identifier of the location relative to other fault locations in the software program. For example, the first fault location may have a location number equal to "1." The second fault location may have a location number equal to "2." In some embodiments, the information obtained may include a list of output variables and output variable types of the statement. The output variable type may include any variable type in a software program, including booleans, integers, floating point numbers, strings, characters, among other software programming variable types and other variable types. In addition, in some embodiments, the information obtained may include the original statement at the fault location.

For example, if a fault location is the second fault location and has the statement "return (y>171)," the information of the fault location that may be obtained may be a location number "2," an input variable "y," an input variable type "integer," an output type "boolean," and an original statement "y>171."

At block 406, an instrumentation function based on a predefined template may be generated. The instrumentation function may be generated by altering a predefined instrumentation function template using the set of information obtained in block 404. In some embodiments, the predefined instrumentation function template may include one or more coverage function templates configured to determine whether a particular test covers a particular fault location. Additionally or alternatively, the predefined instrumentation function template may include one or more value function templates configured to generate information about the execution of the statement such as the value of variables that are in the statement. Additionally or alternatively, one or more of the value function templates may be configured to record the initial value of a variable and the number of bits that the value of the variable changes after execution of the statement. In some embodiments, the predefined instrumentation function template may include one or more patch identification function templates configured to determine whether a repair candidate has been generated for a particular fault location and one or more interpretation function templates configured to interpret the repair candidate. The instrumentation function may be configured to return the original statement of the fault location in response to a patch not being present at the fault location and to interpret the repair candidate in response to the patch being present at the fault location.

The predefined function templates may be combined with the set of information obtained in block 404 to create a fault location-specific instrumentation function. For example, a patch identification function template may be "repair_candidate_exists(location)." Continuing the example above, the patch identification function template may be combined with the information obtained to generate an instrumentation function "repair_candidate_exists(2)." An interpretation function template may be "if repair_candidate_exists(location) then interpret(location_patch) else return original-statement." The predefined function template may be combined with the statement information obtained to generate an instrumentation function "if repair_candidate_exists(2) then interpret(2_patch) else return "y>171."" Additionally or alternatively, a coverage function template or a value function template may be combined with fault location information to generate fault location-specific instrumentation functions.

At block 408, the instrumentation function generated in block 406 may be added to the source code of the software program. The instrumentation function generated in block 406 may include a set of code instructions that may be added to the software program to implement the instrumentation function. In some embodiments, adding the instrumentation function to the source code may include adding the code instructions of the instrumentation function to an existing software module of the software program. In some embodiments, adding the instrumentation function to the source code may include adding the code instructions of the instrumentation function to a new software module of the software program.

At block 410, a statement at the fault location may be replaced with a call to the instrumentation function. The original statement at the fault location may be replaced with a call to the instrumentation function that was generated in block 406. The instrumentation function may be configured to return the original statement in response to a patch not being implemented at the fault location. Replacing the statement with a call to the instrumentation function may include changing the source code of the software program at the fault location to remove the statement and adding the call to the instrumentation function.

At block 412, it may be determined if there are additional fault locations that have not had an instrumented function added. In response to determining that there are additional fault locations ("Yes"), the method may return to block 402 and select another fault location. In response to determining that there are no additional fault locations ("No"), the method may proceed to block 414.

At block 414, common instrumentation functions may be added to the software program. In some embodiments, the same or substantially the same instrumentation functions (referred to as "common instrumentation functions") may be used for the different fault locations. The common instrumentation functions may be added to the software program such that they may be called for the different fault locations. As such, instead of instrumenting each fault location with separate instrumentation functions, the common instrumentation functions may be used.

At block 416, the software program with the instrumented functions may be compiled to generate a machine code version of the software program. The compilation of the software program with the instrumented functions may be performed using any standard compilation method to generate a machine code version from a software program.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the generation of an instrumentation function based on a predefined template may include additional instrumentation functions or fewer instrumentation functions. In some implementations, adding the instrumentation function to the source code of the software program and replacing the statement with a call to the instrumentation function may be combined into one step and the statement may be replaced with the instrumentation function.

In addition, in some embodiments, the method 400 may be performed iteratively in which a single fault location and a single repair candidate that corresponds to the fault location may be analyzed at a time. Additionally or alternatively, one or more operations associated with one or more blocks may be performed with respect to multiple fault locations or multiple repair candidates at a time.

Figure 5:
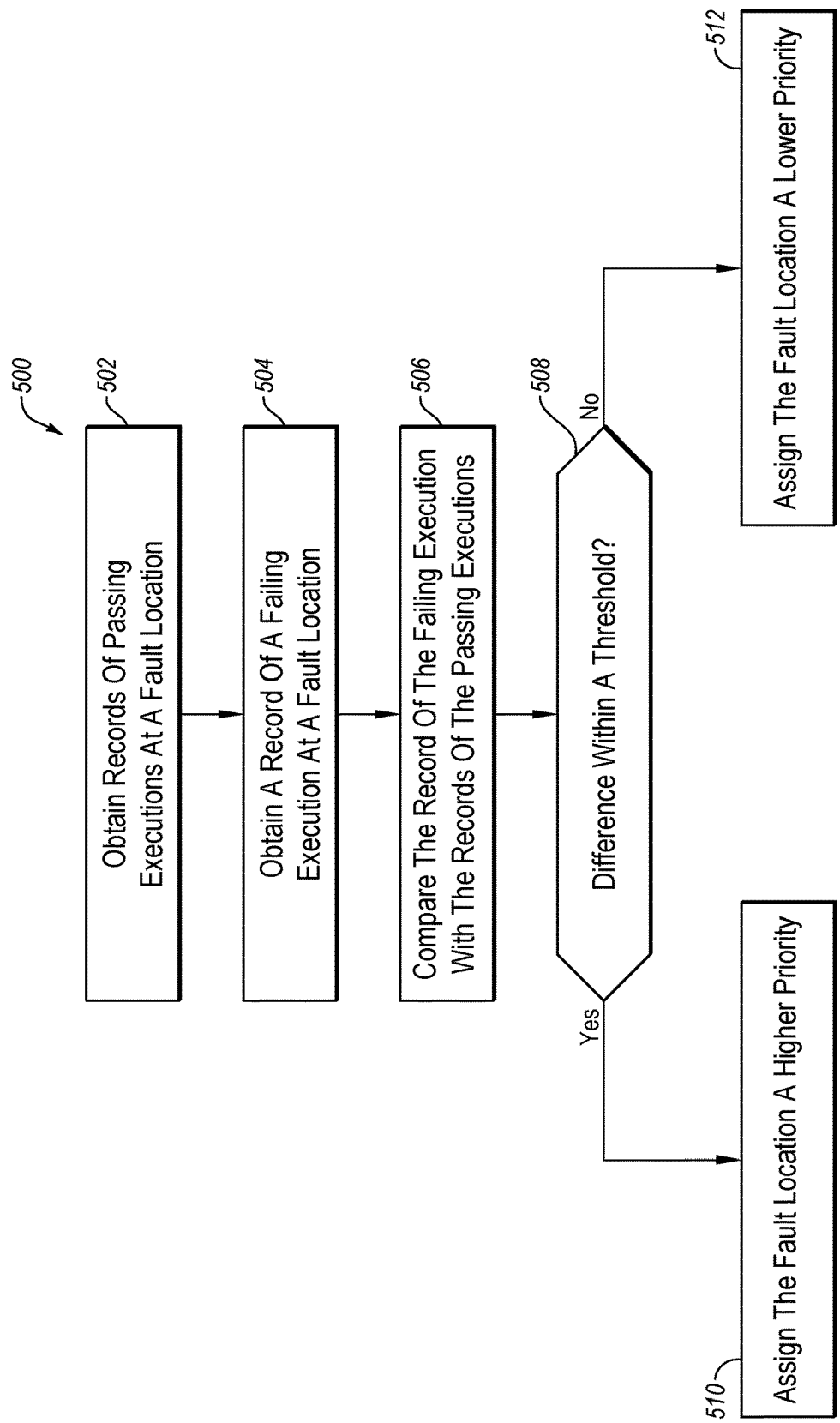
FIG. 5 depicts a flowchart of an example method of prioritizing fault locations.

FIG. 5 depicts a flowchart of an example method 500 of prioritizing a fault location, according to at least one embodiment described in the present disclosure. The method 500 may be performed by any suitable system, apparatus, or device with respect to code under test (e.g., the code under test 104 of FIG. 1). For example, the repair module 106 of FIG. 1 or the computing system 202 of FIG. 2 (e.g., as directed by a repair module) may perform or direct performance of one or more of the operations associated with the method 500 with respect to code under test of the software program. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where records of one or more passing executions at a fault location may be obtained ("passing records"). The passing records may include any information that may be obtained from the first test execution of block 306 of the method 300. The information obtained may be information generated by one or more instrumentation functions and may include variable names of variables in a statement at the fault location, the value or values of variables in the statement at the fault location that correspond to the passing executions, the location number of the fault location, the original statement, or other information as described above. In some embodiments, each passing record of a passing execution may include an initial value of a variable and a number of different bits of the value of the variable after execution of the statement with respect to executing the corresponding passing test. The initial value of the variable and the number of different bits of the value of the variable may represent a value range of the variable.

In some embodiments, the number of different bits of the value of the variable may be a binary representation of the difference between a value of the variable after execution of the statement and the initial value of the variable. The number of different bits of the value may represent which bits of the value of the variable changed after execution of the statement. In some embodiments, the number of different bits of the value may be the result of a bitwise exclusive or ("XOR") operation on the initial value of the variable and the value of the variable after execution of the statement.

For example, the initial value of a variable "x" may be 122. After an execution of the instrumented software program, the value of the variable "x" may be 200. The binary representation of the initial value of "x" may be 01111010. The binary representation of the value of "x" after execution of the instrumented software program may be 11001000. The result of the XOR operation may be: 01111010 XOR 11001000=10110010. The result of the XOR operation may have a decimal value of 178.

In some embodiments, the number of different bits of the value of the variable may be a binary representation of the difference between a value of the variable after execution of the statement and the initial value of the variable. The number of different bits of the value may represent the difference of the integer value of the binary representation of the value of the variable. In some embodiments, the number of different bits may be the result of a subtraction (−) operation on the initial value of the variable and the value of the variable after execution of the statement.

For example, the initial value of a variable "x" may be 122. After an execution of the instrumented software program, the value of the variable "x" may be 200. The binary representation of the initial value of "x" may be 01111010. The binary representation of the final value of "x" may be 11001000. The result of the subtraction operation may be: 11001000−01111010=01001110. The result of the subtraction operation may have a decimal value of 78.

In some embodiments, other operations may be performed to determine a number of different bits between the initial value of a variable and the value of the variable after execution of the statement.

For example, the passing records of three passing executions at a fault location may include the variable "x" and three pairs of initial values and different bits associated with "x." The first pair of a first initial value and a first number of different bits may be 120, 0. The second pair of a second initial value and a second number of different bits may be 120, 1. The third pair of a third initial value and a third number of different bits may be 120, 3.

At block 504, records of one or more failing executions at the fault location may be obtained ("failing records"). The failing records may be largely similar to the passing records of the passing executions that are obtained in block 502. The failings record may include any information that may be obtained from the first test execution of block 306 of the method 300. The information obtained may be information generated by one or more instrumentation functions and may include variable names of variables in a statement at the fault location, the value or values of variables in the statement at the fault location that correspond to failing executions, the location number of the fault location, the original statement, or other information as described above. In some embodiments, each failing of a failing execution may include an initial value of a variable and a number of different bits of the value of the variable after execution of the statement with respect to executing the corresponding failing test. The initial value of the variable and the number of different bits of the value of the variable may represent a value range of the variable.

As a first example, the failing record of a failing execution at a fault location may include the variable "x" and a pair of an initial value and different bits associated with "x." The pair of an initial value and a number of different bits may be 120, 179. As a second example, the failing record of a failing execution at a fault location may include the variable "x" and the pair of an initial value and the number of different bits may be 120, 3.

At block 506, the failing record of the failing execution may be compared with the passing records of the passing executions. The initial value or the number of different of bits of the failing execution may be compared to the initial value or the number of different bits of each of the records of the passing executions. In some embodiments, the record of the failing execution may be compared to a combination of the records of the passing executions. In some embodiments, the record of the failing execution may be compared to each of the records of the passing executions individually.

Continuing the first example, the information from the failing record of the failing execution: 120, 179 may be compared to information from the passing records of the passing executions: 120, 0; 120, 1; and 120, 3. Continuing the second example, the information from the failing record of the failing execution: 120, 3 may be compared to information from the passing records of the passing executions: 120, 0; 120, 1; and 120, 3.

At block 508, it may be determined whether the difference from the comparison in block 506 is within a threshold. In some embodiments, the threshold may be a value and the difference may be within the threshold when the difference is less than the value. In some embodiments, the threshold may be a value and the difference may be within the threshold when the difference is greater than the value. In some embodiments, the threshold range may be determined based on a heuristic analysis of values of the variable. For example, the threshold range may be determined by computing the range of the values of the variable that are associated with passing executions. The threshold may be the range of values of the variable associated with passing executions of the software program. In some embodiments, the values of the variable associated with passing executions may be 0, −2, 5, and 3. The threshold range may be [−2, 5]. In some embodiments, the threshold range may be expressed as an initial value and a delta between the initial value and the maximum value. For example, in some embodiments the range [−2, 5] may be expressed as −2, 7. In some embodiments, the threshold range may be based on an index of the values of the variable associated with passing executions. In response to the difference not satisfying a threshold ("No"), the method may proceed to block 510. In response to the difference satisfying a threshold ("Yes"), the method may proceed to block 512.

Continuing the first example, the information from the record of the failing execution, 120, 179, may be determined to not be within a threshold. In response to such a determination, the method may proceed to block 510. Continuing the second example, the information from the record of the failing execution, 120, 3, may be determined to be within a threshold. In response to such a determination, the method may proceed to block 512.

In some embodiments, in instances in which there are multiple values for the variable or there are multiple variables with at least one value, the lower priority may be assigned in response to none of the values having a difference that satisfies the difference. In these or other embodiments, the prioritization may be based on the amount in the difference. For example, a higher priority may be assigned for a larger difference than for a smaller difference. In some embodiments, the prioritization may include pruning the particular fault location and not selecting the particular fault location for generation of repair candidates. Further, in some instances, there may be no passing test executions with respect to the fault location. In some embodiments, in response to there being not passing test executions, the fault location may be given a relatively high priority.

At block 510, in response to determining that the difference is not within the threshold, a higher priority may be assigned to the fault location. The higher priority may be assigned to the fault location because the difference not being within the threshold may indicate that the fault location behaves substantially differently in a failing execution than in passing executions. The difference not being in the threshold may help indicate that performing repair operations at the fault location may be more likely to be effective.

At block 512, a lower priority may be assigned to the fault location. The lower priority may be assigned to the fault location because the difference being within the threshold may indicate that the fault location does not behave substantially differently in a failing execution than in passing executions. The difference being in a threshold may help indicate that performing repair operations at the fault location may be less likely to be effective. In some embodiments, assigning a lower priority to the fault location may include pruning or discarding the fault location such that the fault location may not be selected in block 310 of the method 300.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the obtaining of a record of a failing execution at a fault location of block 504 may be performed before the obtaining of records of passing executions at a fault location.

In addition, in some embodiments, the method 500 may be performed iteratively in which a single fault location and a single repair candidate that corresponds to the fault location may be analyzed at a time. Additionally or alternatively, one or more operations associated with one or more blocks may be performed with respect to multiple fault locations or multiple repair candidates at a time.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 of FIG. 2) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   identifying a fault location in a software program;
   generating an instrumentation function with respect to the fault location, wherein the instrumentation function is configured to: identify which tests of a test suite execute a statement at the fault location, identify variables that are used by the statement, and identify values of the variables that are used by the statement;
   replacing the statement with the instrumentation function;
   compiling the software program including the instrumentation function;
   performing a first test execution of the compiled software program;
   identifying, based on an output of the instrumentation function in response to the first test execution, a variable used by the statement;
   identifying, based on the output of the instrumentation function in response to the first test execution, a first value of the variable that is associated with a passing test;
   identifying, based on the output of the instrumentation function in response to the first test execution, a second value of the variable that is associated with a failing test;
   identifying, based on the output of the instrumentation function in response to the first test execution, first tests of the test suite that do not execute the statement at the fault location;
   identifying, based on the output of the instrumentation function in response to the first test execution, second tests of the test suite that execute the statement at the fault location;
   determining a level of priority of the fault location for implementation of a repair candidate based on a magnitude of a difference between the first value and the second value;
   implementing, in response to the level of priority, the repair candidate at the fault location as a patch;
   performing, based on the first tests and the second tests, a second test execution of the compiled software program with respect to the patch, wherein the second test execution comprises interpreting the patch without compiling the patch;
   evaluating the patch based on results of the second test execution; and
   accepting or rejecting the patch based on the evaluation.

2. The method of claim 1, wherein the level of priority of the fault location for implementation of the repair candidate is based on whether the magnitude of the difference between the first value and the second value exceeds a threshold.

3. The method of claim 2, wherein the threshold is determined based on a heuristic analysis of values of the variable.

4. The method of claim 2, wherein the threshold is based on values of the variable that are associated with passing tests.

5. The method of claim 1, wherein the second test execution is based on the first tests and the second tests in that the second test execution uses the second tests and does not use the first tests.

6. A method comprising:
   identifying a fault location in a software program;
   generating an instrumentation function with respect to the fault location;
   replacing a statement at the fault location with the instrumentation function;
   compiling the software program including the instrumentation function;
   performing a first test execution of the compiled software program;
   identifying, based on an output of the instrumentation function in response to the first test execution, a variable used by the statement;
   identifying, based on the output of the instrumentation function in response to the first test execution, a first value of the variable that is associated with a passing test;
   identifying, based on the output of the instrumentation function in response to the first test execution, a second value of the variable that is associated with a failing test;
   determining a level of priority of the fault location for implementation of a repair candidate based on a magnitude of a difference between the first value and the second value;
   selecting the fault location for implementation of a repair candidate based on the level of priority of the fault location;
   implementing the repair candidate at the fault location as a patch based on the selection;
   performing a second test execution of the compiled software program with respect to the patch, wherein the second test execution includes interpreting the patch without compiling the patch;
   evaluating the patch based on results of the second test execution; and
   accepting or rejecting the patch based on the evaluation.

7. The method of claim 6, wherein the instrumentation function is configured to: identify which tests of a test suite execute the statement, identify variables that are used by the statement, and identify values of the variables that are used by the statement.

8. The method of claim 1, wherein the level of priority of the fault location for implementation of the repair candidate is based on whether the magnitude of the difference between the first value and the second value exceeds a threshold.

9. The method of claim 8, wherein the threshold is determined based on one or more factors of the following factors: a heuristic analysis of values of the variable; and values of the variable that are associated with passing tests.

10. The method of claim 6 further comprising:
identifying, based on the output of the instrumentation function in response to the first test execution, first tests of a test suite that do not execute the statement at the fault location;
identifying, based on the output of the instrumentation function in response to the first test execution, second tests of the test suite that execute the statement at the fault location; and
performing the second test execution of the compiled software program based on the first tests and the second tests.

11. The method of claim 10, wherein the second test execution is based on the first tests and the second tests in that the second test execution uses the second tests and does not use the first tests.

12. A method comprising:
identifying a first fault location in a software program;
identifying a second fault location in the software program;
generating a first instrumentation function with respect to the first fault location;
generating a second instrumentation function with respect to the second fault location;
replacing a first statement at the first fault location with the first instrumentation function;
replacing a second statement at the second fault location with the second instrumentation function;
compiling the software program including the first instrumentation function and the second instrumentation function;
performing a first test execution of the compiled software program;
identifying, based on a first output of the first instrumentation function in response to the first test execution, a first-statement variable used by the first statement;
identifying, based on the first output of the first instrumentation function in response to the first test execution, a first value of the first-statement variable that is associated with a passing first-statement test;
identifying, based on the first output of the first instrumentation function in response to the first test execution, a second value of the first-statement variable that is associated with a failing first-statement test;
assigning, based on a magnitude of a difference between the first value of the first-statement variable and the second value of the first-statement variable, in response to the first test execution, a first priority to the first fault location;
identifying, based on a second output of the second instrumentation function in response to the first test execution, a second-statement variable used by the second statement;

identifying, based on the second output of the second instrumentation function in response to the first test execution, a first value of the second-statement variable that is associated with a passing second-statement test;
identifying, based on the second output of the second instrumentation function in response to the first test execution, a second value of the second-statement variable that is associated with a failing second-statement test;
assigning, based on a magnitude of a difference between the first value of the second-statement variable and the second value of the second-statement variable, in response to the first test execution, a second priority to the second fault location;
selecting, in response to the second priority being higher than the first priority, the second fault location over the first fault location;
implementing a repair candidate at the second fault location as a patch based on selection of the second fault location and based on the second output of the second instrumentation function in response to the first test execution;
performing a second test execution of the compiled software program with respect to the patch, wherein the second test execution includes interpreting the patch without compiling the patch;
evaluating the patch based on results of the second test execution; and
accepting or rejecting the patch based on the evaluation.

13. The method of claim 12, wherein the first instrumentation function is configured to: identify which tests of a test suite execute the first statement, identify variables that are used by the first statement, and identify values of the variables that are used by the first statement and wherein the second instrumentation function is configured to: identify which tests of the test suite execute the second statement, identify variables that are used by the second statement, and identify values of the variables that are used by the second statement.

14. The method of claim 12, wherein assigning the first priority to the first fault location is based on whether the magnitude of the difference between the first value of the first-statement variable and the second value of the first-statement variable exceeds a threshold.

15. The method of claim 12, wherein assigning the second priority to the second fault location is based on whether the magnitude of the difference between the first value of the second-statement variable and the second value of the second-statement variable exceeds a threshold.

16. The method of claim 12, further comprising:
identifying, based on the second output of the second instrumentation function in response to the first test execution, first tests of a test suite that do not execute the second statement at the second fault location;
identifying, based on the second output of the second instrumentation function in response to the first test execution, second tests of the test suite that execute the second statement at the second fault location; and
performing the second test execution of the compiled software program based on the first tests and the second tests, wherein the second test execution is based on the first tests and the second tests in that the second test execution uses the second tests and does not use the first tests.

* * * * *